(12) United States Patent
Nakada et al.

(10) Patent No.: US 7,120,326 B2
(45) Date of Patent: Oct. 10, 2006

(54) OPTICAL ELEMENT, OPTICAL INTEGRATED DEVICE, OPTICAL INFORMATION TRANSMISSION SYSTEM, AND MANUFACTURING METHODS THEREOF

(75) Inventors: Masafumi Nakada, Tokyo (JP); Keishi Ohashi, Tokyo (JP); Jun Akedo, Ibaraki (JP)

(73) Assignees: NEC Corporation, (JP); National Institute of Advanced Industrial Science and Technology, (JP)

( * ) Notice: Subject to any disclaimer, the term of this patent is extended or adjusted under 35 U.S.C. 154(b) by 135 days.

(21) Appl. No.: 10/998,211

(22) Filed: Nov. 26, 2004

(65) Prior Publication Data

US 2005/0147343 A1 Jul. 7, 2005

(30) Foreign Application Priority Data

Nov. 27, 2003 (JP) ............................. 2003-397880
Nov. 24, 2004 (JP) ............................. 2004-338997

(51) Int. Cl.
G02B 6/132 (2006.01)
G02B 6/13 (2006.01)

(52) U.S. Cl. ..................... 385/14; 385/130; 385/141

(58) Field of Classification Search ............... 385/14, 385/129–132, 141
See application file for complete search history.

(56) References Cited

U.S. PATENT DOCUMENTS 4,855,102 A * 8/1989 Okada et al. ............... 419/8
5,411,792 A * 5/1995 Yukinobu et al. ........... 428/212

FOREIGN PATENT DOCUMENTS

| JP | 2001003180 | 1/2001 |
|----|-----------|--------|
| JP | 2001038274 | 2/2001 |
| JP | 2002020878 | 1/2002 |
| JP | 2002235181 | 8/2002 |

OTHER PUBLICATIONS

K.D. Preston and G.H. Haertling, "Comparison of electro-optic lead-lanthanum zirconate titanate films on crystalline and glass substrates", *Applied Phys. Letters*, vol. 60, No. 23, Jun. 1992, pp. 2831-2833.

K. Nashimoto, et al., "Patterning of (Pb,La) (Zr, Ti)O3 waveguides for fabricating micro-optics using wet etching and solid-phase epitaxy," *Applied Phys. Letters*, vol. 75, No. 8, Aug. 1999, pp. 1054-1056.

Akedo, Jun et al., "Microstructure and Electrical Properties of Lead Zirconate Titanate (Pb(Zr52/Ti48)O3) Thick Films Deposited by Aerosol Deposition Method", Mechanical Engineering Laboratory, Agency of Industrial Sciene and Technology, Ministry International Trade and Industry, May 7, 1999, *Jpn. J. Appl. Phys.* vol. 38, Part. 1, No. 98, Sep. 1999, pp. 5397-5401.

(Continued)

Primary Examiner—John D. Lee
(74) Attorney, Agent, or Firm—Hayes Soloway P.C.

(57) ABSTRACT

An optical element is formed from a molded body which is formed using an impact consolidation phenomenon in which mechanical impact is applied to ultra fine fragile particles which are supplied onto a substrate so that the ultra fine fragile particles are pulverized and bonded to each other. In the optical element, $d^6/\lambda^4 < 4 \times 10^{-5}$ nm$^2$ holds, in which d (nm) represents the average radius of a part of the molded body, such as a pore (void) or a different phase, having a refractive index different from that of a primary component of the molded body, and in which $\lambda$ (nm) represents the wavelength of light transmitting through the molded body.

21 Claims, 16 Drawing Sheets

OTHER PUBLICATIONS

Akedo, Jun et al., "Ceramics Coating Technology Based on Impact Adhesion Phenomenon with Ultrafine Particles-Aerosol Deposition Method for High Speed Coating at Low Temperature", National Institute of Advanced Industrial Science Technology, Tsukuba, Mar. 25, 2002, 8 pages.

* cited by examiner

OPTICAL ELEMENT, OPTICAL INTEGRATED DEVICE, OPTICAL INFORMATION TRANSMISSION SYSTEM, AND MANUFACTURING METHODS THEREOF

This application claims priority to prior application JP 2003-397880 and JP-2004-338997, the disclosure of which is incorporated herein by reference.

BACKGROUND OF THE INVENTION

1. Field of the Invention

The present invention relates to optical elements used for optical communication, optical wiring, or optical storage, optical integrated devices each formed by integrating the optical elements, optical information transmission systems, and manufacturing methods thereof.

2. Description of the Related Art

Optical communication and optical storage devices have been widely used in recent years. Therefore optical elements have been increasingly in demand. In particular, following the practical use of wavelength multiplexing of optical communication, the use of optical elements for metro and access networks have been increased instead of so-called backbone network systems which are primarily formed using optical fibers. Therefore, as optical elements used in add-drop multiplexers for optical signals, instead of elements formed in combination of bulk materials, use has been increasingly made of planar waveguides which are reduced in size and made of thin optical material films and can be easily integrated with various elements.

The planar waveguide is generally formed of a quartz or silicon substrate and an amorphous material such as silicon oxide provided thereon. As a method for forming a thin film, for example, use is made of a flame deposition method in which a thin film is formed by depositing a material using flame treatment or a vapor-phase growth method such as CVD. The thin film obtained is formed into a predetermined shape by a reactive ion etching method or the like, so that an optical element is obtained.

In order to effectively control light including modulation and switching of optical signal, it is necessary to use a physical effect which is obtained through the interaction between an exterior input signal such as electricity or heat and a material forming an optical element. As a silicon-based planar waveguide, for example, an optical switch using a thermooptic effect and comprising a directional coupler provided with a heater, and a switch formed in combination with MEMS have been known. Unfortunately, both types of switches have slow response, in the microsecond range. An optical switch using a thermooptic effect consumes a large amount of electric power, and an MEMS type switch has a complicated structure and is expensive.

Because of its high speed of response, low power consumption due to voltage drive system, and a simple structure, an electrooptic effect in which the refractive index is changed by the interaction between an electric field and a material has been used for an optical modulator. In order to form an optical modulator using $LiNbO_3$, a Mach-Zehnder waveguide is formed on a single crystal $LiNbO_3$ substrate by the use of a Ti diffusion method and is combined with electrodes. When a voltage is applied to the electrodes, the refractive index of the waveguide can be changed, and as a result, ON/OFF operation of an optical signal can be performed. However, since it is required to use a single crystal substrate, the modulator described above is expensive. Further, since the length of the waveguide must be increased due to a small electrooptic effect of $LiNbO_3$, the size of the element is extremely and problematically increased to several centimeters.

$Pb_{1-x}La_x(Zr_yTi1-y)_{1-x/4}O_3$ (PLZT) as a transparent ceramic has a larger electrooptic coefficient by approximately two orders of magnitude than that of a $LiNbO_3$ single crystal and has recently been used to form an optical modulator. Therefore, the size of an optical element may be decreased, and consequently, reduction in cost, lower power consumption, and higher speed of response can be expected. Accordingly, investigation of sol-gel processes for forming thinner films of PLZT have been carried out (see K. D. Preston and G. H. Haertling, Appl. Phys. Lett. 60 (1992), p. 2831, and K. Nashimoto, K. Haga, M. Watanabe, S. Nakamura and E. Osakabe, Appl. Phys. Left. 75 (1999), p. 1054).

However, in order to form a thin film having a high transmittance and a high electrooptic effect, epitaxial growth must be performed, and a single crystal substrate must also be used as an underlying material. Accordingly, waveguides other than silicon-based waveguides are not easily formed on a substrate. In addition, a film-forming process in accordance with a sol-gel method must be performed for a long time in order to obtain a film having the thickness required for an optical element. Therefore, the cost is disadvantageously increased.

Electrooptic materials such as $LiNbO_3$ and PLZT are ferroelectric materials. This property appears when the particular crystal structures of the individual materials are formed. Therefore, when an electrooptic material is used for an optical element, it has been believed that a single crystal substrate thereof must be used or that an electrooptic material must be epitaxially grown on a single crystal substrate.

Hereinafter, the formation of nanophotonic devices which can realize the integration between light and electronics on one chip will be further desired as a significant innovative technique. In order to realize the devices described above, a technique in which an LSI such as a central processing unit (CPU) or a memory and an active optical element such as an optical switch are formed on the same chip must be developed. In addition, a technique in which an electrooptic material such as PLZT is deposited with high crystallinity on a silicon or a quartz substrate must also be developed.

On the other hand, as a novel ceramic film-forming method an aerosol deposition (AD method) has been developed. The AD method is a film-forming method based on an impact consolidation phenomenon and utilizes the phenomenon of collision and coalescence of ultra fine particles. Compared to a related thin film-forming method, the AD method is expected to realize higher film-forming rates and low process temperatures (see Jun Akedo and Maxim Lebedev, "MATERIA"41, (2002), P. 459 and Jun Akedo and Maxim Lebedev, Jpn. J. Appl. Phys. 38, (1999), P. 5397). Moreover, in the AD method, the properties of a film are independent of any underlayer, and therefore, a material for the substrate can be optionally selected.

A technique disclosed in Japanese Unexamined Patent Application Publication No. 2001-3180 is a film-forming technique in accordance with the AD method and is characterized in that ultra fine fragile particles provided on a substrate are pulverized by applying mechanical impact so that the ultra fine fragile particles are bonded to each other or that the ultra fine fragile particles are bonded to each other and are bonded to the substrate. As a result, the bonding between the ultra fine particles is realized, and without applying heat, a film having a high density and a high strength can be formed.

A technique disclosed in Japanese Unexamined Patent Application Publication No. 2002-235181 relates to the structure formed in accordance with the AD method and is characterized in that the structure is a polycrystal material in which no crystal orientations exist and in which grain boundaries made of glass layers are not substantially present. In addition, this structure is characterized in that the average crystal particle diameter is 50 nm or less and in that the compactness is 99% or more. The average crystal particle diameter disclosed in Japanese Unexamined Patent Application Publication No. 2002-235181 is the size of the crystal particle calculated in accordance with the Scherrer method of X-ray diffraction analysis.

A technique disclosed in Japanese Unexamined Patent Application Publication No. 2002-20878 is a film-forming technique in accordance with the AD method in which ultra fine particles are sprayed onto a substrate surface and is characterized in that at least part of this spray flow is obliquely incident on the substrate surface. As a consequence, a film can be formed in which the ultra fine particles therein are sufficiently bonded to each other, the texture is dense, the surface is smooth, and the density is uniform.

A technique disclosed in Japanese Unexamined Patent Application Publication No. 2001-38274 is a technique for forming a planarized film composed of ultra fine particles in accordance with the AD method and is characterized in that the film formation is carried out by performing at least one planarizing step for planarizing the surface of a film formed by deposition.

As described above, the development of techniques for piezoelectric materials and the like in accordance with the AD method has significantly advanced. However, the application of the AD method to optical elements has not been studied and, with respect to PZT and PLZT thin films, the transparency thereof have only been reported as of today. The transparency of the film obtained by the AD method is 30 dB/mm or more in terms of the transmission loss, and therefore, it is impossible to apply this film for optical elements.

SUMMARY OF THE INVENTION

It is therefore an object of the present invention to provide a molded body having a high transparency formed by the AD method and is also to provide an optical element formed using the molded body.

It is another object of the present invention to provide a method for manufacturing a highly transparent molded body by the AD method and a manufacturing apparatus which is optimally used for the manufacturing method.

Furthermore, it is still another object of the present invention to provide an optical integrated device incorporating an optical element which is formed from the molded body formed by the AD method.

In order to achieve the objects described above, the molded body of the present invention is a molded body formed by an impact consolidation phenomenon in which a mechanical impact is applied to ultra fine fragile particles supplied onto a substrate so that the ultra fine fragile particles are pulverized and are bonded to each other, and when a scattering central radius of the molded body is represented by d, $d \leq 15$ nm holds.

According to the second aspect of the present invention, since the average radius d (nm) and the light wavelength $\lambda$ (nm) transmitting through the molded body are set so that $d^6/\lambda^4 < 1 \times 10^{-5}$ holds, the light scattering central radius can be sufficiently smaller than the light wavelength. As a result, a more transparent optical element can be obtained by an impact consolidation phenomenon.

In accordance with a first aspect of the present invention, there is provided an optical element produced by applying mechanical impact to ultra fine fragile particles supplied onto a substrate so that the ultra fine fragile particles are pulverized and bonded to each other in accordance with an impact consolidation phenomenon to form a molded body. In the molded body described above, $d^6/\lambda^4 < 4 \times 10^{31\ 5}$ nm$^2$ holds, in which d (nm) is the average radius of a pore or a different phase contained in the molded body, which has a refractive index different from that of a primary component of the molded body, and in which $\lambda$ (nm) is the wavelength of light transmitting through the molded body.

In the present invention, the transparency of a molded body formed by an impact consolidation phenomenon is generated by Rayleigh scattering. Rayleigh scattering occurs when the size of a scatter is sufficiently smaller than the wavelength of light. In such a case, the scatter is assumed to be placed in a uniform electromagnetic filed which spatially vibrates, where the intensity of scattering can be defined by the wavelength and the radius of the scatter. The average radius d (nm) and the light wavelength $\lambda$ (nm) transmitted through the molded body are set so that $d^6/\lambda^4 < 4 \times 10^{-5}$ holds. Therefore, the light scattering central radius can be sufficiently smaller than the light wavelength. As a result, a transparent optical element can be obtained by an impact consolidation phenomenon.

In accordance with a second aspect of the present invention, there is provided an optical element produced by applying mechanical impact to ultra fine fragile particles supplied onto a substrate so that the ultra fine fragile particles are pulverized and bonded to each other to form a molded body. In the molded body described above, $d^6/\lambda hu 4 < 1 \times 10^{-5}$ nm$^2$ holds, in which d (nm) is the average radius of a pore, a different phase, or the like contained in the molded body, which has a refractive index different from that of a primary component of the molded body, and in which $\lambda$ (nm) is the wavelength of light transmitted through the molded body.

According to the second aspect of the present invention, since the average radius d (nm) and the light wavelength $\lambda$ (nm) transmitting through the molded body are set so that $d^6/\lambda^4 < 1 \times 10^{-5}$ holds, the light scattering central radius can be sufficiently smaller than the light wavelength. As a result, a more transparent optical element can be obtained by an impact consolidation phenomenon.

In accordance with a third aspect of the present invention, there is provided a method for forming a molded body by applying a mechanical impact to ultra fine fragile particles supplied onto a substrate so that the ultra fine fragile particles are pulverized and bonded to each other to form the molded body, and comprising a step for selectively removing particles having weak bonding forces therebetween.

According to the present invention, the particles having weak bonding forces therebetween are selectively removed. Thus content of a component forming the light scattering centers can be reduced, and the scattering central radius can also be decreased. As a consequence, a transparent optical element can be obtained by an impact consolidation phenomenon.

In the method for manufacturing a molded body according to the third aspect of the present invention, the particles having weak bonding forces therebetween may be a part of the ultra fine fragile particles, which is insufficiently pulverized, and/or a phase different from a primary component of the molded body.

According to the present invention, since the particles having weak bonding forces therebetween, namely, the part of the ultra fine fragile particles which is insufficiently pulverized and/or the different phase from the primary component of the molded body is removed, the content of a component forming the light scattering centers can be reduced, and the scattering central radius can also be decreased. Consequently, a transparent optical element can be obtained by an impact consolidation phenomenon.

Since the ultra fine fragile particles, which are insufficiently pulverized, are larger than fine crystal particles of the primary component of the molded body, flying particles are not likely to collide against places which are located behind the insufficiently pulverized ultra fine fragile particles. As a consequence, pores are likely to be formed. Since these large and coarse particles are formed by insufficient pulverization, new fresh surfaces are not easily formed, and as a result, the bonding force to the film surface tends to be decreased as compared to that between the fine crystal particles which primarily form the film. In addition, the different phase, which is the other factor of forming scattering centers, also has a weak bonding force to the film surface because the composition and the crystal structure of the different phase are different from those of the fine crystal particles primarily forming the film.

In the method for manufacturing a molded body according to the third aspect of the present invention, at least one of a material, particle diameter, coagulation state, supplying speed, hardness, and incident angle of the ultra fine fragile particles may be a factor of the step of selectively removing the particles having weak bonding forces therebetween, in which the incident angle described above is with respect to the substrate.

According to the present invention, by changing at least one of a material, particle diameter, coagulation state, supplying speed, hardness, and incident angle of the ultra fine fragile particles, in which the incident angle is with respect to the substrate, the balance between the speed of removing the particles having weak bonding forces therebetween and the speed of depositing fine crystal particles primarily forming the film is controlled so that the particles having weak bonding forces therebetween can be selectively removed. Accordingly, the content of a component forming the light scattering centers can be reduced, and the scattering central radius can also be decreased. As a result, a transparent optical element can be obtained by an impact consolidation phenomenon.

In the method for manufacturing a molded body, described above, the step of selectively removing particles having weak bonding forces therebetween may be performed by ultra fine particles supplied from at least one nozzle different from a nozzle supplying the ultra fine fragile particles, which are formed into a primary component of the molded body, onto the substrate.

According to the present invention, since the nozzle for supplying the ultra fine fragile particles which are formed into a primary component of the molded body and the nozzle for supplying the ultra fine particles to remove the particles having weak bonding forces therebetween are separately provided, deposition conditions for forming the molded body and particle-removing conditions can be optimized, respectively. Accordingly, the content of a component forming the light scattering centers can be reduced, and the scattering central radius can also be decreased. Thus, a transparent optical element can be obtained by an impact consolidation phenomenon.

In the method for manufacturing a molded body described above, the ultra fine particles for removing the particles having weak bonding forces therebetween are preferably dry ice ($CO_2$).

According to the present invention, when dry ice ($CO_2$) is used as the ultra fine particles for removing the particles having weak bonding forces therebetween, the particle-removing particles composed of dry ice having high volatility are not incorporated into the film. Accordingly, light scattering is not caused by the particle-removing particles incorporated into the film. Thus, a transparent optical element can be obtained by an impact consolidation phenomenon.

The method for forming a molded body, described above, may further comprise the step of irradiating the molded body with electromagnetic waves in order to selectively decrease bonding forces between the particles having weak bonding forces therebetween. Thus, the selective removal of particles is promoted.

In the present invention, by irradiating the molded body with electromagnetic waves such as microwaves or infrared laser in order to selectively decrease the bonding forces between the particles having weak bonding forces therebetween, a temperature thereof can be selectively increased, so that the bonding forces can be further decreased. Thus, the selective removal of the particles having weak bonding forces therebetween can be promoted.

The optical element according to the first or the second aspect of the present invention may comprise a lower electrode, a waveguide, and an upper electrode provided in that order on the waveguide. In which the waveguide is formed from the molded body.

In the optical element of the present invention, when the waveguide is formed on the lower electrode using an impact consolidation phenomenon, the properties of the waveguide are not depend on the type and the structure of a lower electrode material. As a consequence, the lower electrode material can be freely selected in view of the optimum optical design.

In accordance with a fourth aspect of the present invention, there is provided an optical integrated device comprising a first optical element and a second optical element integrated therewith on a substrate, in which the first optical element is formed from a molded body which is formed by applying a mechanical impact to ultra fine fragile particles supplied onto the substrate so that the ultra fine fragile particles are pulverized and bonded to each other, and in which the second optical element is at least one selected from the group consisting of a laser, an electrooptic converter, a photoelectric converter, an optical amplifier, an optical waveguide, an optical filter, and the like. In the optical integrated device described above, $d^6/\lambda^4 < 4 \times 10^{-5}$ $nm^2$ holds, in which d (nm) is the average radius of a pore (void) or a different phase contained in the molded body, which has a refractive index different from that of a primary component of the molded body, and in which $\lambda$ (nm) is the wavelength of light transmitting through the molded body.

According to the present invention, the integration of a plurality of optical elements, which has been difficult due to different manufacturing processes of the plurality of optical elements, can be performed at room temperature on any type of underlying material by an impact consolidation phenomenon. Thus, an optical integrated device can be realized.

In accordance with a fifth aspect of the present invention, there is provided an optical integrated device comprising an optical element and an electronic circuit integrated therewith on a substrate, in which the optical element is formed from a molded body which is formed by applying a mechanical impact to ultra fine fragile particles supplied onto the substrate so that the ultra fine fragile particles are pulverized and bonded to each other, and in which the electronic circuit is at least one of a central processing unit (CPU), a memory, and the like. In the optical integrated device described above, $d^6/\lambda^4 < 4\times10^{-5}$ nm$^2$ holds, in which d (nm) is the average radius of a pore (void) or a different phase contained in the molded body, which has a refractive index different from that of a primary component of the molded body, and in which $\lambda$ (nm) is the wavelength of light transmitting through the molded body.

According to the present invention, the integration of an optical element and an electronic circuit on the same substrate, which has been difficult due to different manufacturing processes thereof, can be performed at room temperature on any type of underlying material by an impact consolidation phenomenon. Thus, an optical integrated device can be realized.

In accordance whit a sixth aspect of the present invention, there is provided an optical information transmission system comprising an optical element formed from a molded body which is formed by applying a mechanical impact to ultra fine fragile particles supplied onto a substrate so that the ultra fine fragile particles are pulverized and bonded to each other. In the optical information transmission system described above, a light wave having a wavelength of 800 nm or more is transmitted through the optical element.

According to the sixth aspect of the present invention, since the light wavelength transmitted through the molded body which forms the optical information transmission system is set to 800 nm or more, the light scattering central radius in the molded body can be sufficiently smaller than the light wavelength. Thus, an optical information transmission system having a small waveguide loss can be obtained.

In accordance with a seventh aspect of the present invention, there is provided an optical information transmission system comprising an optical integrated device composed of a first optical element and a second optical element integrated on a substrate. The first optical element is composed of a molded body formed by applying a mechanical impact to ultra fine fragile particles supplied onto the substrate so that the ultra fine fragile particles are pulverized and bonded to each other, and the second optical element is at least one selected from the group consisting of a laser, an electrooptic converter, a photoelectric converter, an optical amplifier, an optical waveguide, an optical filter, and the like. In the optical information transmission system described above, a light wave having a wavelength of 800 nm or more is transmitted through the optical integrated device.

According to the seventh aspect of the present invention, when the light wavelength transmitting the molded body, which forms the optical information transmission system, is set to 800 nm or more, the light scattering central radius in the molded body can be sufficiently smaller than the light wavelength. Thus, an optical information transmission system having a small waveguide loss can be obtained.

In accordance with an eighth aspect of the present invention, there is provided an optical information transmission system comprising an optical integrated device composed of an optical element and an electronic circuit integrated on a substrate. The optical element is formed from a molded body which is formed by applying a mechanical impact to ultra fine fragile particles supplied onto the substrate so that the ultra fine fragile particles are pulverized and bonded to each other, and the electronic circuit is at least one of a central processing unit (CPU), a memory, and the like. In the optical information transmission system described above, a light wave having a wavelength of 800 nm or more is transmitted through the optical integrated device.

According to the eighth aspect of the present invention, when the light wavelength transmitting the molded body, which forms the optical information transmission system, is set to 800 nm or more, the light scattering central radius in the molded body can be sufficiently smaller than the light wavelength. Thus, an optical information transmission system having a small waveguide loss can be obtained.

In accordance with a ninth aspect of the present invention, there is provided an optical element produced by applying a mechanical impact to ultra fine fragile particles supplied onto a substrate so that the ultra fine fragile particles are pulverized and bonded to each other to form a molded body, wherein: $d^6/\lambda^4 < 4\times10^{-5}$ nm$^2$ holds, d (nm) being the average radius of a pore or a different phase contained in the molded body, which has a refractive index different from that of a primary component of the molded body, $\lambda$ (nm) being the wavelength of light transmitting through the molded body, and $d^6/\lambda^4 < 4\times10^{-5}$ nm$^2$ holds, D (nm) being an average radius of the primary component of the molded body, $\lambda$ (nm) being the wavelength of light transmitting through the molded body.

In accordance with a tenth aspect of the present invention, there is provided an optical element, wherein: $d^6/\lambda^4 < 4\times10^{-5}$ nm$^2$ holds, d (nm) being an average radius of a pore or a different phase contained in a molded body, which has a refractive index different from that of a primary component of the molded body, $\lambda$ (nm) being a wavelength of light transmitting through the molded body, and $d^6/\lambda^4 < 4\times10^{-5}$ nm$^2$ holds, D (nm) being an average radius of the primary component of the molded body, $\lambda$ (nm) being the wavelength of light transmitting through the molded body.

With respect to the ninth and tenth aspects of the present invention, the aerosol deposition (AD method) has an advantage in which a functional oxide having a high property can be deposited with a low cost. In order to achieve the transparency, two structures are required.

First, it is necessary to reduce scattering when a substance such as a pore (void) or a different phase or the like, which has a refractive index different from that of the molded body, is contained therein. In order to reduce the scattering point, it is required that $d^6/\lambda^4 < 4\times10^{-5}$ nm$^2$ holds to maintain the transparency, d (nm) being an average radius of a pore or a different phase contained in a molded body, which has a refractive index different from that of a primary component of the molded body, $\lambda$ (nm) being a wavelength of light transmitting through the molded body Second, in a material having a high optical anisotropy, scattering of a grain boundary becomes large so that the transparency is decreased. In this case, in order to reduce the scattering point, it is required that $D^6/\lambda^4 < 4\times10^{31\ 5}$ nm$^2$ holds to maintain the transparency, D (nm) being an average radius of the primary component of the molded body, $\lambda$ (nm) being the wavelength of light transmitting through the molded body.

Both cases can be introduced based upon Rayleigh scattering.

As mentioned above, according to the present invention, a mechanical impact is applied to ultra fine fragile particles so that the ultra fine fragile particles are pulverized and bonded to each other to form a molded body. As a consequence, an optical element having an improved transparency can be formed from the molded body.

DESCRIPTION OF THE PREFERRED EMBODIMENTS

In order to enable a molded body formed by applying a mechanical impact to ultra fine fragile particles so that the ultra fine fragile particles are pulverized and bonded to each other to be practically used for an optical element, intensive research and many experiments were carried out. As a result, an element having a high transparency as compared to that realized in the past was obtained. In addition, through the consideration of the results in view of the light scattering theory, the present invention was completed.

Hereinafter, example 1 will be described in detail together with the principle of the present invention.

EXAMPLE 1

Figure 2:
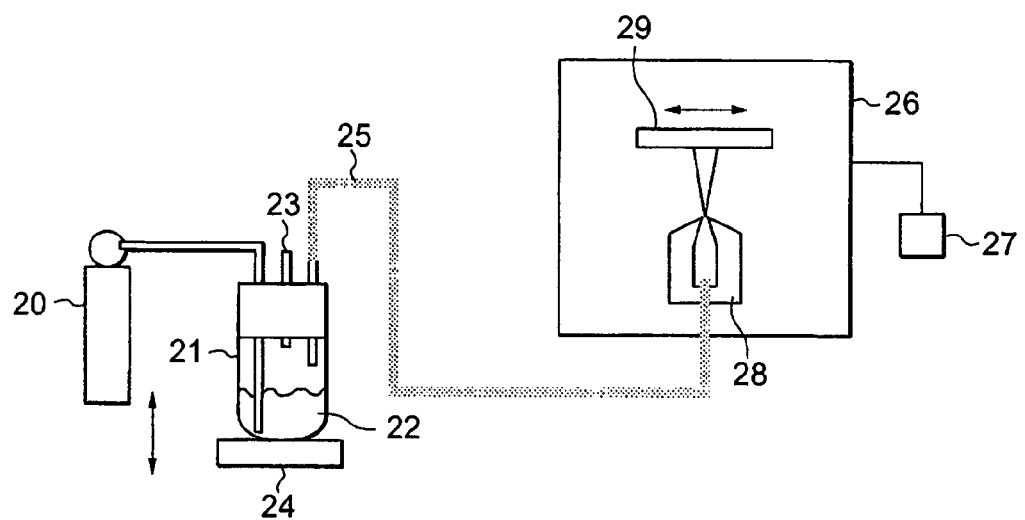
FIG. 2 is a schematic view for illustrating a film-forming apparatus according to Example 1 of the present invention.

Referring to FIG. 2, a gas cylinder 20 containing a nitrogen gas was connected to a glass bottle 21 through a pipe. Powdered raw material 22 was introduced into the glass bottle 21, and the inside thereof was evacuated to approximately 20 Torr through an exhaust pipe 23. Next, nitrogen was fed into the glass bottle 21 as a carrier gas while the flow rate was controlled. When the glass bottle 21 was vibrated by a vibrator 24, an aerosol composed of fine particles of the powdered raw material dispersed in the gas and was then carried to a film-forming chamber 26 through a pipe 25 with the carrier gas. The film-forming chamber 26 was evacuated to a predetermined degree of vacuum by a vacuum pump 27. The powder was sprayed onto a substrate 29 through a nozzle 28 to form a thin film.

PLZT as a transparent ceramic having a large electrooptic effect was used as a film-forming material and was deposited on a glass substrate. $N_2$ was used as a carrier gas, and three samples were formed by changing the incident angle of the nozzle with respect to substrate, the gas flow rate, the growth rate, and the vibration frequency of the vibrator. The film-forming conditions are shown in Table 1. In the composition represented by $Pb_{1-x}La_x(Zr_yTi_z)_{1-x/4}O_3$, x, y, and z were set to 0.09, 0.65, and 0.35, respectively. The average particle diameter of the powdered raw material was 0.7 μm. The composition has a dielectric region which is called Relaxor and has a perovskite crystal structure. The composition had a large quadratic electrooptic coefficient and was generally applied to an optical device.

Figure 3:
FIG. 3 shows three samples of appearance and cross-sectional FE-SEM images, formed by different film-forming conditions, according to Example 1 of the present invention.

FIG. 3 shows appearances of the three samples and cross-sectional FE-SEM images thereof, the samples being formed under the different film-forming conditions.

TABLE 1

| | Film-forming condition of samples | | | | |
|---|---|---|---|---|---|
| Sample No. | Incident Angles | Carrier Gas | Flow rate Of carrier gas | Distance between nozzle and substrate | Growth Rate | Frequency of vibrator |
| No. 1 | 30° | Nitrogen | 8 l/min | 10 mm | 0.8 μm/min | 250 rpm |
| No. 2 | 0° | Nitrogen | 4 l/min | 10 mm | 4.2 μm/min | 350 rpm |
| No. 3 | 0° | Nitrogen | 4 l/min | 10 mm | 0.8 μm/min | 400 rpm |

In order to remove the influence of the surface roughness on the transmittance, the surface of the sample was polished. The film thickness of each sample was 4 μm. The degrees of transparency of the three samples were considerably different from each other. Sample No. 1 was most transparent, while the degrees of transparency of sample Nos. 2 and 3 were decreased respectively. From the cross-sectional FE-SEM images, it was found that, in sample Nos. 1 and 2 which had a high degree of transparency, ultra fine particles having a diameter of 100 nm or less are densely bonded to each other. However, it was also found that, in sample No. 3 having a low degree of transparency, a large amount of particles having a diameter of approximately 0.3 μm is present in the film.

Figure 4:
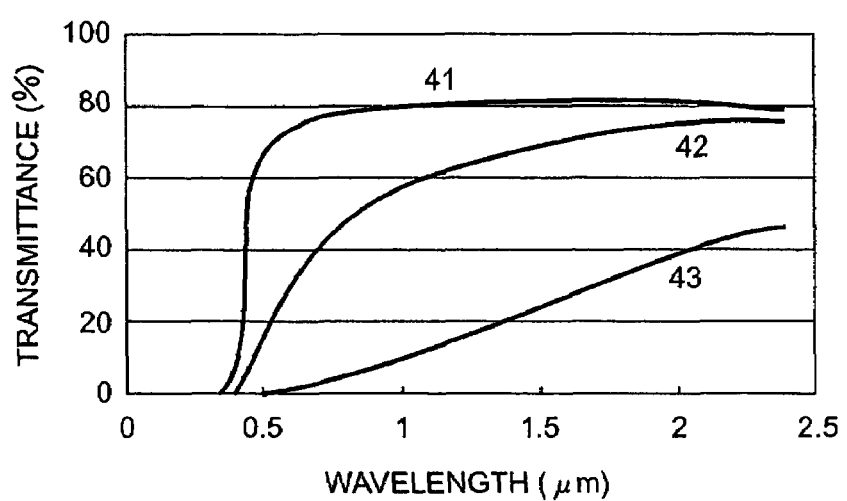
FIG. 4 is a graph showing transmission spectra of three samples formed by different film-forming conditions, according to Example 1 of the present invention.

FIG. 4 shows transmission spectra of the individual samples.

The transmittance was measured by the use of a spectrophotometer (UV-365, manufactured by Shimadzu Corporation). Transmittance 41 of sample No. 1 was increased as the wavelength was increased and approximately saturated at a wavelength of 1 μm or more. On the other hand, transmittances 42 and 43 of sample Nos. 2 and 3, respectively, were not saturated even at a wavelength of 2 μm.

The inventors of the present invention first disclosed that the difference in transmittance among the samples was caused by the difference in pore (void) diameter and the presence or absence of a phase (also referred to as a "different phase") having a different composition. Hereinafter, with reference to the observation results of the images of composition distribution obtained by transmission electron microscope (TEM) and EDX, the disclosure will be described.

Figure 5A:
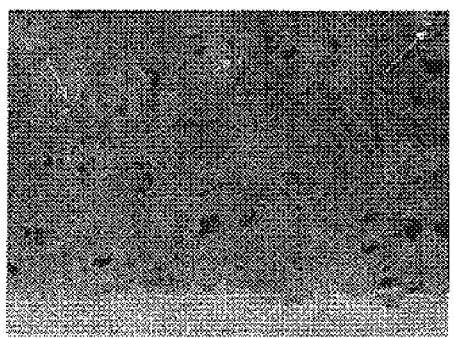
FIGS. 5A and 5B are TEM images of two samples formed by different film-forming conditions, according to Example 1 of the present invention.
Figure 5B:
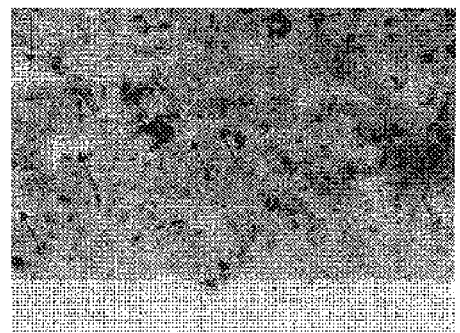

FIGS. 5A and 5B are views showing TEM bright field images.

In sample No. 1 having a high transmittance shown in FIG. 5A, ultra fine particles having a diameter of several tens of nanometers were densely bonded to each other, and small pores were partially observed. The places of the pores are indicated by white arrows in the image. The average pore radius was 15 nm. On the other hand, in sample No. 2 having a low transmittance shown in FIG. 5B, pores having a submicron diameter were present, and the average pore radius was increased to 25 nm. The portions of the pores are indicated by black arrows in the image. The difference in refractive index between the pore and fine particles forming a molded body was large, and therefore, light scattering occurs.

In addition, the refractive index of the different phase differs from that of a primary material of the film, thereby causing light scattering. In order to evaluate the uniformity of the film, the EDX image of element distribution along the cross-section was observed.

FIGS. 6A to 6D show the images of element distribution of Pb and Zr which are constituent elements.

Figure 6A:
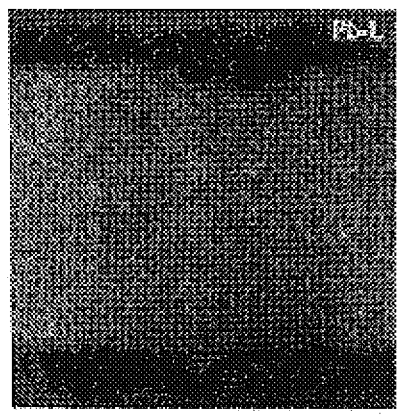
FIGS. 6A to 6D are views showing EDX composition distributions of two samples formed by different film-forming conditions, according to Example 1 of the present invention.
Figure 6B:
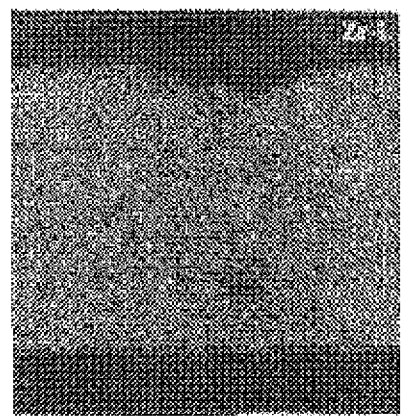
Figure 6C:
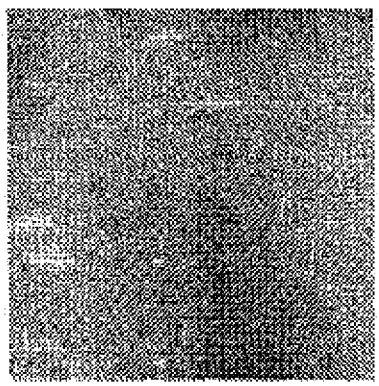
Figure 6D:
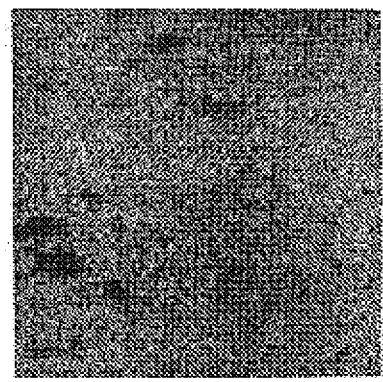

FIGS. 6A and 6B show a Pb distribution image and a Zr distribution image, respectively, of sample No. 1 having a high transmittance. The shading of the image indicates the distribution of each element. It was found that both Pb and Zr are uniformly distributed and that a phase (different phase) having a different composition is not present. In addition, FIGS. 6C and 6D show a Pb distribution image and a Zr distribution image, respectively, of sample No. 2 having a low transmittance. FIG. 6C shows the Pb distribution image, part having a high Pb concentration and in FIG. 6D shows the Zr distribution image, the part corresponding to the aforementioned part has a low concentration. The aforementioned part was only composed of Pb and oxygen and was estimated to be composed of PbO by x-ray diffraction measurement. The average particle diameter was 80 nm. The refractive index of PbO is different from that of PLZT, thereby causing light scattering. As described above, it is clearly understood that the difference in transmittance between sample Nos. 1 and 2 is caused by the difference in pore (void) diameter and the presence or not of a phase (different phase) having a different composition.

Next, in order to find the reason in which the considerable difference in transmittance was generated by different forming methods, analysis was carried out In accordance with the light scattering theory.

Based on the film-forming conditions for sample Nos. 1, 2, and 3 described above, samples having different thicknesses were formed by changing the film-forming time, and the transmittance spectra thereof were measured.

Figure 7:
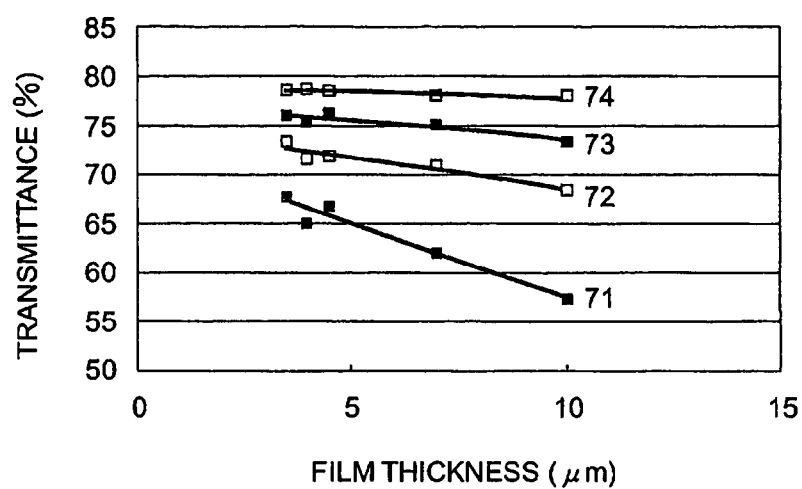
FIG. 7 is a graph showing the film thickness dependence of the transmittance measured at various wavelengths of sample No. 1 according to Example 1 of the present invention.

FIG. 7 shows the thickness dependence of the transmittance of sample No. 1 at various wavelengths.

The transmittance was measured using a spectrophotometer (UV-365, manufactured by Shimadzu Corporation). Lines 71, 72, 73, and 74 show the transmittances measured at wavelengths of 500, 600, 800, and 1,550 nm, respectively. The transmittance is decreased as the film thickness is increased, and the thickness dependence of the transmittance is increased as the wavelength is decreased. The decrease in transmittance of PLZT, which has no optical absorption in the wavelength region of this measurement, is primarily caused by the Fresnel reflection at the interface and scattering. The change in transmittance with the film thickness can be represented by equation (1) based on the Lambert-Beer law.

$$T=(1-Rp)(1-Rps)(1-Rs)\text{Exp}(-\beta' t) \quad (1)$$

In the above equation (1), Rp represents the Fresnel reflection at the surface of the PLZT; Rps represents the Fresnel reflection at the interface between the PLZT and the substrate; Rs represents the Fresnel reflection at the surface of the substrate; β represents the excitation coefficient; and t represents the thickness of the PLZT. Among those described above, the transmission loss caused by the Fresnel reflection can be prevented by the addition of an antireflection layer or the like, and the decrease in excitation coefficient generated by scattering caused by grain boundaries or the like becomes important.

Through intensive research carried out by the inventors of the present invention, it was found that, in sample No. 1 having a high transmittance, the excitation coefficient β is determined by Rayleigh scattering. In Rayleigh scattering, when the size of a scatter is sufficiently smaller than a light wavelength the scatter is assumed to be placed in a uniform electromagnetic filed which spatially vibrates, and the excitation coefficient in this case can be represented by equation (2) (see K. Miyauchi and G Toda, "Opto-Ceramics" p. 33 (1984), by Gihoudo Shuppan K. K.).

$$\beta = \Sigma m_i ((128\pi^5/3\lambda^4) * di^{6''}((M^2-1)(M^2+2))^2) \quad (2)$$

In equation (2), $m_i$ represents the number of scattering centers; λ represents the wavelength: di represents a radius of the scattering center; and M represents the difference in refractive index between the scatter and a medium.

Since the wavelength dependence of the refractive index of PLZT is small, M can be kept constant. Therefore, when the proportional relationship between β and $\lambda^{-4}$ is shown, it can be verified that, in sample No. 1 having a high transmittance, the change in excitation coefficient β with the wavelength is caused by Rayleigh scattering.

Figure 8:
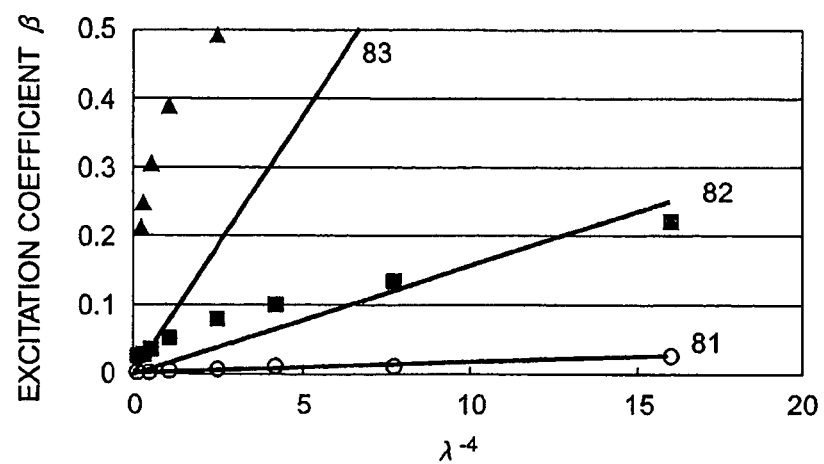
FIG. 8 is a graph showing the relationship between the excitation coefficient β and $\lambda^{-4}$ of three samples formed by different film-forming conditions, according to Example 1 of the present invention.

FIG. 8 is a graph showing the relationship between the excitation coefficient β and $\lambda^{-4}$ of the individual sample Nos. 1, 2, and 3.

Figure 9:
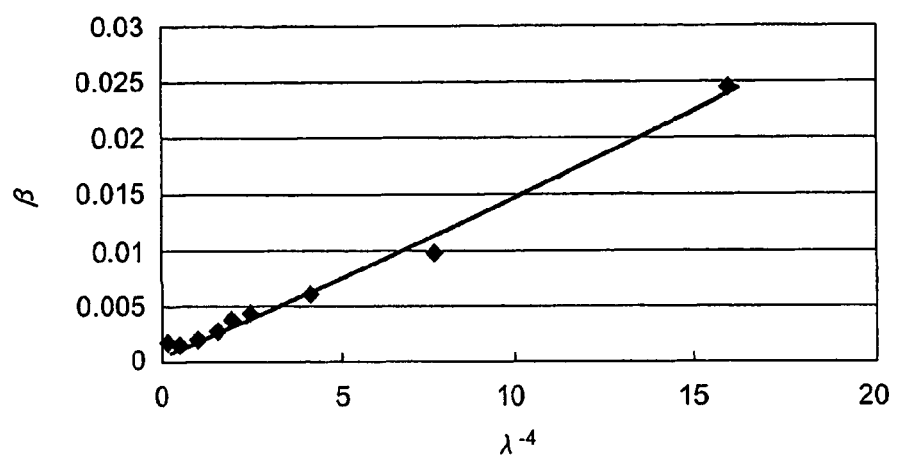
FIG. 9 is a graph showing the relationship between the excitation coefficient β and $\lambda^{-4}$ of sample No. 1 according to Example 1 of the present invention.

Lines 81, 82, and 83 correspond to samples Nos. 1, 2, and 3, respectively. The solid line indicates an approximate line obtained from data of each sample, and in sample Nos. 2 and 3 each having large pores and different phases in the film, the proportional relationship between the excitation coefficient β and $\lambda^{-4}$ is not observed, and hence the attenuation of transmitting light cannot be explained by Rayleigh scattering. FIG. 9 is an enlarged graph showing the relationship between the excitation coefficient β and $\lambda^{-4}$ of sample No. 1.

In sample No. 1 having a high transmittance, in which the pore diameter is small and no different phase is present, the proportional relationship between the excitation coefficient β and $\lambda^{-4}$ holds, and therefore, it is clearly understood that the attenuation of light is caused by Rayleigh scattering.

Accordingly, in order to decrease the excitation coefficient β, increase in wavelength λ of light to be used, decrease in radius d of the scattering center, and decrease in refractive index difference M between the scatter and the medium are effective. That is, when the radius d of the scattering center can be sufficiently decreased as compared to the wavelength $\lambda$, a practically usable and transparent optical element can be realized.

Figure 1:
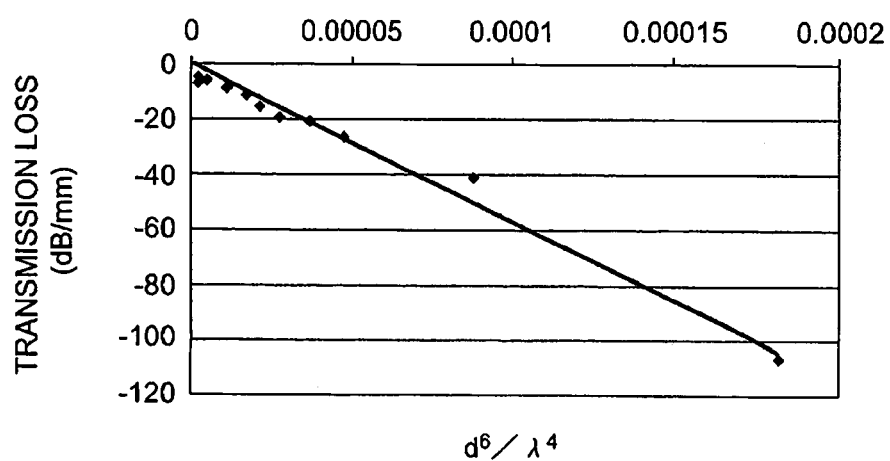
FIG. 1 is a graph showing the relationship between the transmission loss and crystal diameter/wavelength $d^6/\lambda^4$, according to Example 1 of the present invention.

Based on the experimental results described above, the relationships are summarized. In FIG. 1, the relationship between the transmission loss and $d^6/\lambda^4$ of sample No 1 is shown in which the attenuation of light can be explained by Rayleigh scattering.

The radius d was 15 nm which was obtained from the TEM image. Since the transmittance loss which can be applied to an optical element is 20 dB/mm, the range of $d^6/\lambda^4 < 4 \times 10^{-5}$ nm$^2$ or less. In addition, since a desirable transmittance loss used for an optical element is 5 dB/mm, the range of $d^6/\lambda^4$ is $1 \times 10^{-5}$ nm$^2$ or less.

Figure 10:
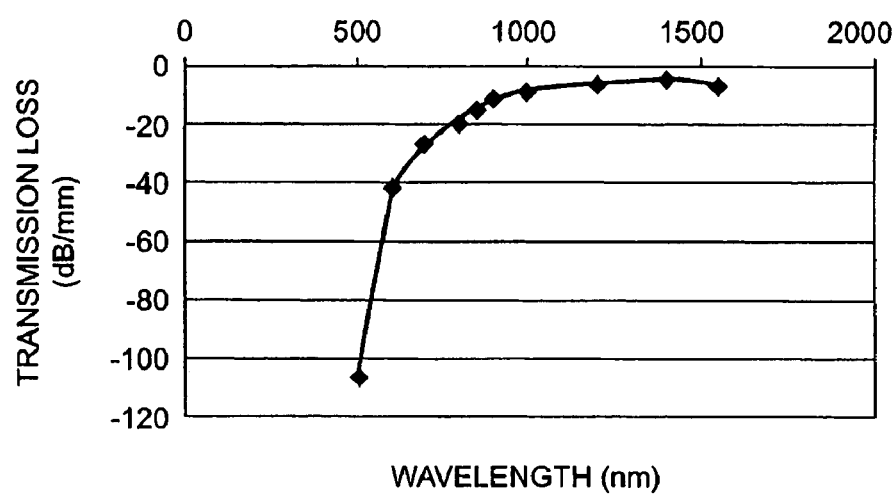
FIG. 10 is a graph showing the relationship between the transmission loss and the wavelength, according to Example 1 of the present invention.

In addition, in an optical information transmission system using the optical element formed in accordance with the method of the present invention, a usable light wavelength has a lower limit. According to this example, the wavelength dependence of the transmission loss of the film optimally formed in accordance with this film-forming method is as shown in FIG. 10.

The transmittance loss is rapidly decreased as the wavelength is increased. In the optical information transmission system using the optical element formed in accordance with this film-forming method, in order to obtain a practical transmission loss, the wavelength of light to be used for transmitting information must be set to 800 nm or more.

EXAMPLE 2

Figure 11:
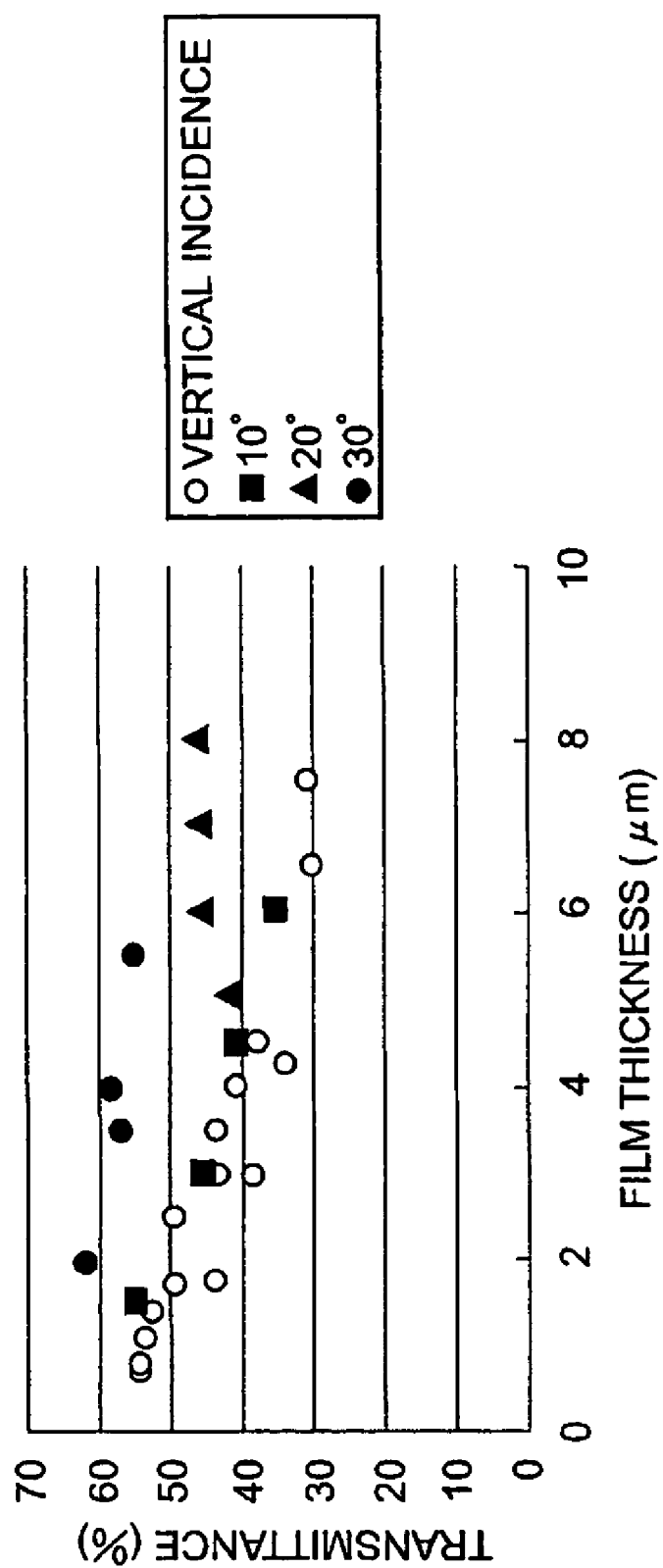
FIG. 11 is a graph showing the film thickness dependence of the transmittance measured at various incident angles of a nozzle with respect to a substrate, according to Example 2 of the present invention.

FIG. 11 shows the thickness dependence of transmittance at various incident angles of the nozzle with respect to the substrate according to Example 2. A film-forming apparatus was identical to that used in Example 1. As the carrier gas, nitrogen was used, and the gas flow rate and the distance between the nozzle and the substrate were set constant, such as 8 l/min and 25 mm, respectively. In the composition of $(Pb_{1-x}La_x)(Zr_yTi_z)_{1-x/4}O_3$, x, y, and z were 0.09, 0.65, and 0.35, respectively. The transmittance was measured by a spectroscopic analytical system (DU640, manufactured by Beckman Counter Inc.) at a wavelength of 800 nm. At an incident angle of 10°, the transmittance was substantially equivalent to that obtained by vertical incidence, and when the incident angle was changed to 20° or more, the transmittance could be significantly increased. Accordingly, it is construed that the increase in transmittance shown in Example 1 was obtained by the change in incident angle.

The mechanism which can considerably decrease the number of pores and different phases in the film by the incident angle effect can be construed as described below. When a powdered raw material having an average particle diameter of 0.7 μm is allowed to collide against the substrate, a mechanical impact is applied to the powder, so that fragile oxide particles were pulverized and bonded to each other to form a molded body. However, due to a non-uniform speed, shape, diameter, coagulated state of flying particles, large and coarse particles were also formed by insufficient pulverization and were bonded to the surface of the film.

The presence of large and coarse particles can be confirmed by the SEM image of sample No. 3 shown in FIG. 3, and by the TEM image of sample No. 3 shown in FIG. 5B. In the case described above, the flying particles are not likely to collide with part of the surface located behind the large and coarse particles, and therefore, pores are liable to be formed. Since the large and coarse particles are formed by insufficient pulverization, new fresh surfaces are not easily formed, and as a result, the bonding force to the surface of the film tends to be small as compared to that of fine crystal particles primarily forming the film. In addition, the different phase, which is the other reason of causing the decrease in transmittance, also has a weak bonding force to the film surface because the composition and the crystal structure of the different phase are different from those of the fine crystal particles primarily forming the film.

By increasing the incident angle of fine particles, the incident particles are allowed to have a kinetic momentum in an oblique direction, and therefore, the effect of removing the particles bonded to the surface of the film is increased. Accordingly, when the incident angle is appropriately selected, particles having weak bonding forces therebetween can be selectively removed. When the incident angle is excessively increased, the removing effect is also excessively increased, and as a result, the film cannot be formed In Example 2, when the incident angle was increased to 40° or more, the film was hardly formed by deposition.

The selective removal of particles having weak bonding forces therebetween by the control of the incident angle, described in Example 2, is merely one example of a method for manufacturing an optical element having a high transmittance. When at least one of a material, particle diameter, coagulation state, speed, and hardness of the ultra fine particles is changed, the selective removal described above can be performed. Hereinafter, Examples will be further described.

EXAMPLE 3

Figure 12:
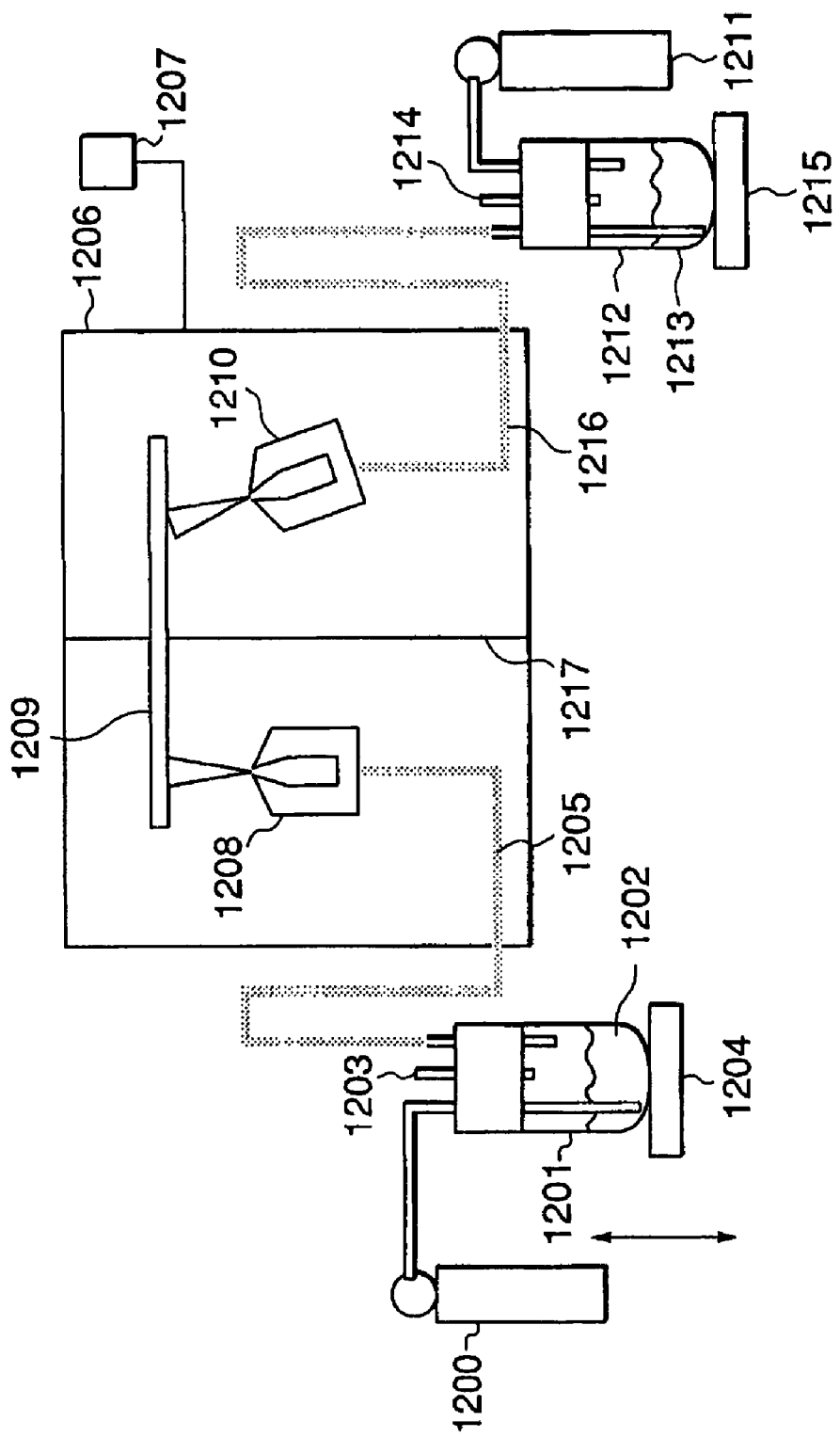
FIG. 12 is a schematic view for illustrating a film-forming apparatus according to Example 3 of the present invention.

FIG. 12 is a schematic view showing a film-forming apparatus used in Example 3.

Two nozzles for spraying powder were provided. Unlike the case of Example 1, one nozzle was used for forming a thin film while the other nozzle was used for spraying particles to selectively remove particles having weak bonding forces. A gas cylinder 1200 containing a nitrogen gas was connected to a glass bottle 1201 through a pipe. After a powdered raw material 1202 was placed in the glass bottle 1201, and the inside thereof was evacuated to approximately 20 Torr through an exhaust pipe 1203, nitrogen was fed as a carrier gas while the flow rate thereof was controlled. When the glass bottle 1201 was vibrated by a vibrator 1204, powdered aerosol was generated and was then carried to a film-forming chamber 1206 through a pipe 1205 with the carrier gas.

The film-forming chamber 1206 was evacuated to a predetermined level by a vacuum pump 1207. The powder was sprayed from a nozzle 1208 onto a substrate 1209 to thereby form a thin film. The substrate 1209 rotated, and a nozzle 1210 was provided at a position opposite to the nozzle 1208 with respect to the center of the substrate 1209 for spraying particles thereto for selectively removing particles having weak bonding forces. A gas cylinder 1211 containing a nitrogen gas is connected to a glass bottle 1212 through a pipe.

After a particle-removing powder 1213 was placed in the glass bottle 1212, and the inside thereof was evacuated to approximately 20 Torr through an exhaust pipe 1214, nitrogen was fed as a carrier gas while the flow rate thereof was controlled. When the glass bottle 1212 was vibrated by a vibrator 1215, powdered aerosol was generated and was then carried to the film-forming chamber 1206 through a pipe 1216 with the carrier gas. At the center of the film-forming chamber, a partition 1217 was provided for preventing the powdered raw material and the particle-removing powder from being mixed with each other.

As the powdered raw material and the particle-removing material, PLZT and alumina were used, respectively, and the film was formed on the glass substrate. The rotation speed of the substrate was set to 20 rpm. The incident angle of the nozzle with respect to the substrate was 0° and that of the particle-removing nozzle was 30°. $N_2$ was used as a carrier gas, the flow rate of PLZT was set to a predetermined value of 8 l/min, and the film formation was carried out by changing the flow rate of alumina. In the composition represented by $(Pb_{1-x}La_x)(Zr_yTi_z)_{1-x/4}O_3$, x, y, and z were set to 0.09, 0.66, and 0.35, respectively. The average particle diameter of the powdered raw material PLZT was 0.7 μm, and the average particle diameter of the particle-removing alumina was 1 μm.

When the gas flow rate of alumina was zero, that is, when the film formation was performed only by the use of the powdered raw material, the transmittance of the PLZT film was as low as 42%. The thickness of the film was 4 μm. When the flow rate of alumina was increased, the transmittance was gradually increased, and when the flow rate was increased to 4 l/min, the transmittance was increased to 70%. In this example, as the ultra fine particles used for particle removal, alumina having a particle diameter of 1 μm was used. However, the present invention is not limited thereto, and materials such as fine silica particles or fine diamond particles may also be used. In addition, although the material is not changed, when the particle diameter, coagulation state, speed, or hardness thereof is changed, particles having weak bonding forces therebetween can be selectively removed, and as a result, an optical element having a high transmittance can be formed.

EXAMPLE 4

Figure 13:
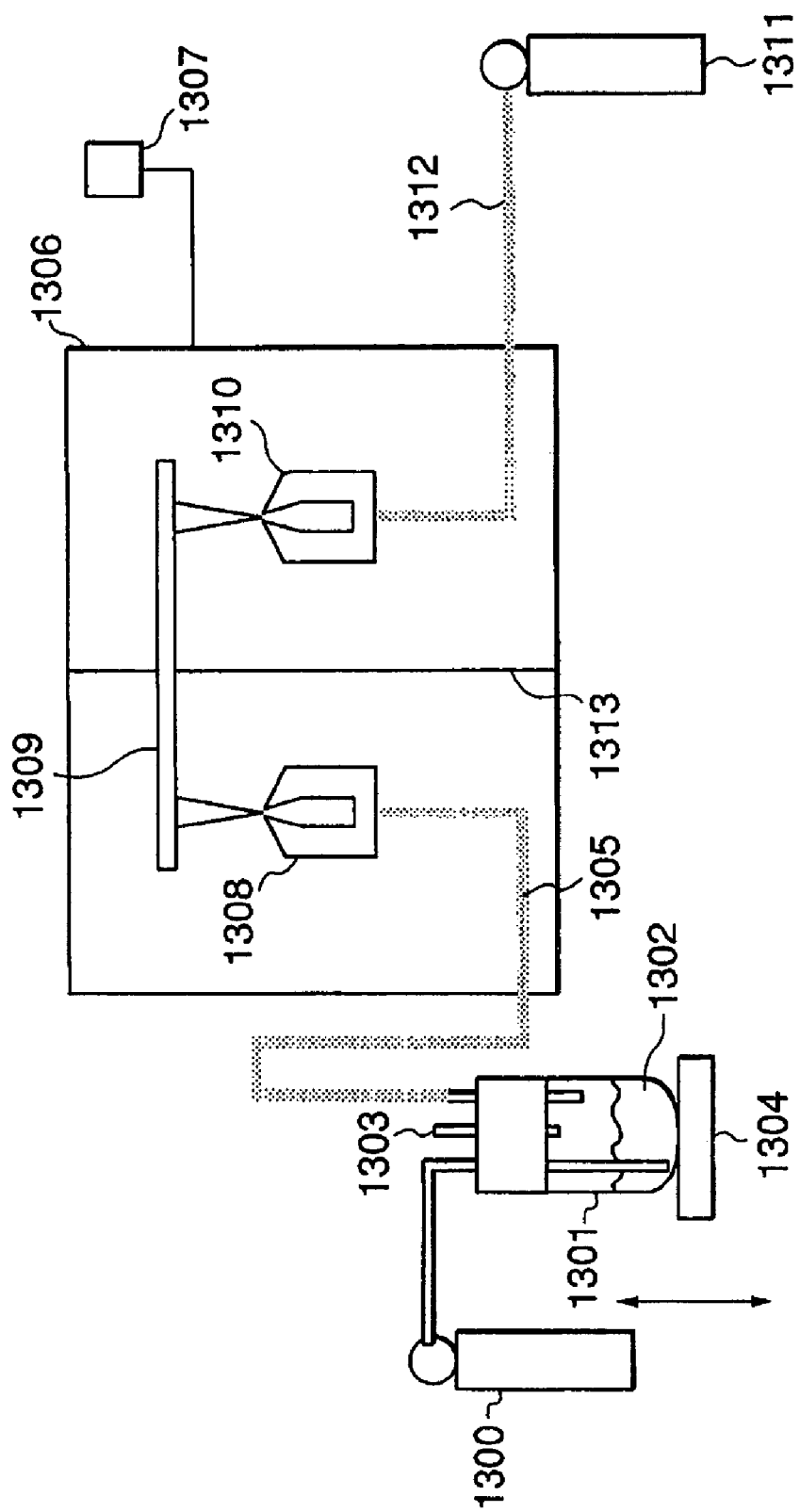
FIG. 13 is a schematic view for illustrating a film-forming apparatus according to Example 4 of the present invention.

FIG. 13 is a schematic view showing a film-forming apparatus used in Example 4.

In Example 4, unlike the case of Example 3, fine particles of dry ice were used for selectively removing particles having weak bonding forces. A gas cylinder 1300 containing a nitrogen gas was connected to a glass bottle 1301 through a pipe. After a powdered raw material 1302 was placed in the glass bottle 1301, and the inside thereof was evacuated to approximately 20 Torr through an exhaust pipe 1303, nitrogen was fed as a carrier gas while the flow rate thereof was controlled.

When the glass bottle 1301 was vibrated by a vibrator 1304, powdered aerosol was generated and was then carried to a film-forming chamber 1306 through a pipe 1305 with the carrier gas. The film-forming chamber 1306 was evacuated by a vacuum pump 1307 to a predetermined evacuation level. The powder was sprayed from a nozzle 1308 onto a substrate 1309 to thereby form a thin film. The substrate 1309 rotated, and a nozzle 1310 was provided at a position opposite to the nozzle 1308 with respect to the center of the substrate 1309 for spraying fine particles of dry ice ($CO_2$) to selectively remove particles having weak bonding forces. A gas cylinder 1311 containing a $CO_2$ gas was connected to the film-forming chamber 1306 through a pipe 1312. When being fed from the nozzle 1310 into the film-forming chamber 1306 at a low pressure, the $CO_2$ gas was adiabatically expanded and condensed, thereby forming fine particles. A partition 1313 was provided at the center of the film-forming chamber, in order to prevent the fine dry ice particles and the powdered raw material from being mixed with each other.

PLZT was used as a material for forming the film, and the film was formed on the glass substrate. The rotation speed of the substrate was set to 20 rpm. The incident angle of the film-forming nozzle and that of the dry ice nozzle with respect to the substrate were both 0°. $N_2$ was used as a carrier gas of the powdered raw material, the gas flow rate of PLZT was set to 8 l/min, and the gas flow rate of the dry ice was set to 11 l/min. In the composition represented by $(Pb_{1-x}La_x)(Zr_yT_z)_{1-x/4}O_3$, x, y, and z were set to 0.09, 0.65, and 0.35, respectively. The average particle diameter of the powdered raw material PLZT was 0.7 μm. When the film formation was carried out only using the powdered raw material, that is, when the formation was performed without spraying the dry ice, the transmittance of the PLZT film was as low as 42%. The film thickness was 4 μm. When the dry ice was sprayed, the transmittance was increased to 72%. Since having high volatility, the dry ice was vaporized immediately after removing particles having weak bonding forces therebetween, and therefore, the particle-removing particles were not incorporated into the film. Accordingly, light scattering will not be caused by the particle-removing particles, and consequently, an optical element having a high transmittance can be obtained.

EXAMPLE 5

Figure 14:
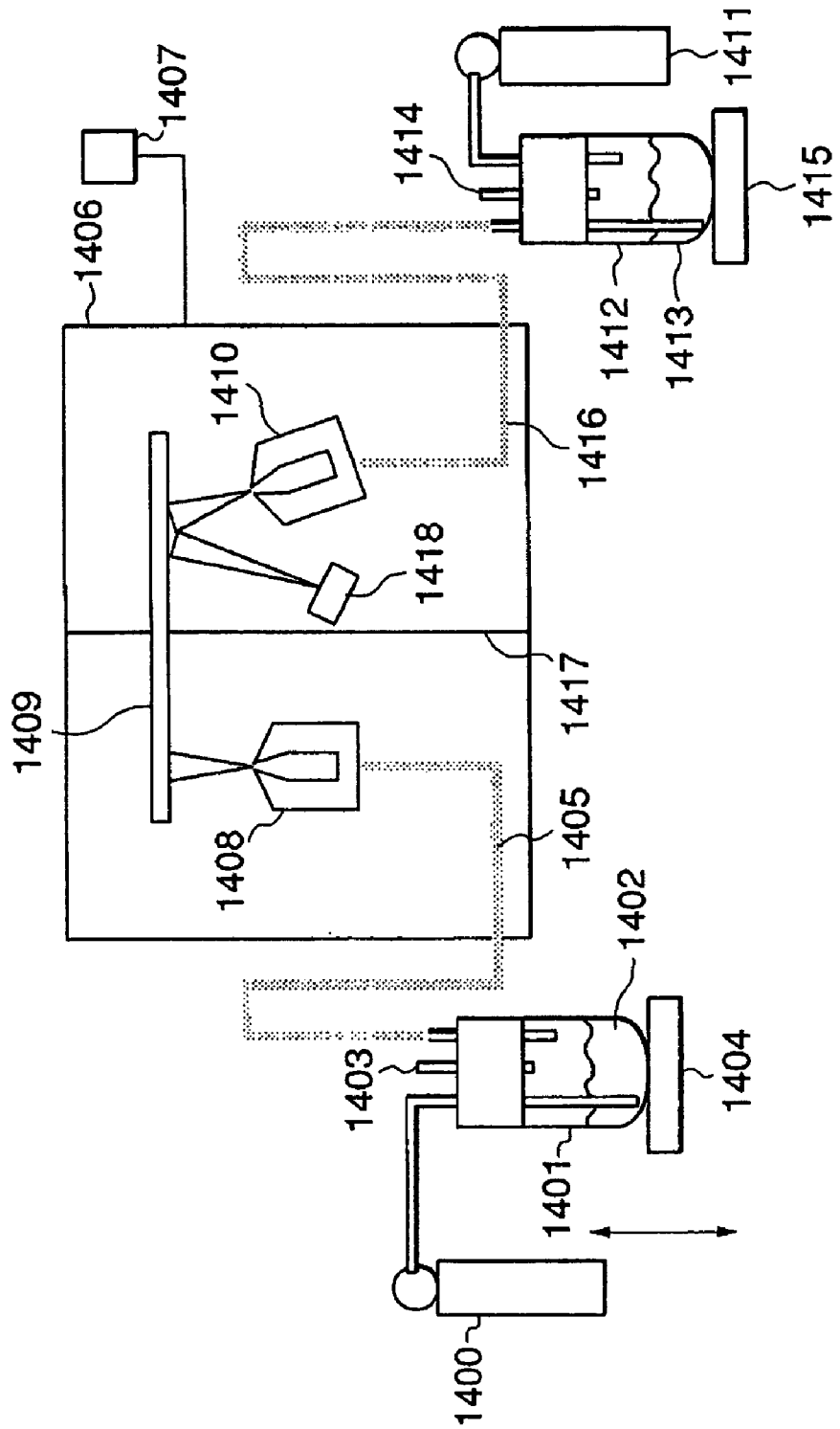
FIG. 14 is a schematic view for illustrating a film-forming apparatus according to Example 5 of the present invention.

FIG. 14 is a schematic view showing a film-forming apparatus used in Example 5.

In Example 5, unlike the case of Example 3, laser light was concentrated on a place of a substrate onto which particle-removing particles for selectively removing particles having weak bonding forces are sprayed. A gas cylinder 1400 containing a nitrogen gas was connected to a glass bottle 1401 through a pipe. After a powdered raw material 1402 was placed in the glass bottle 1401, and the inside thereof was evacuated to approximately 20 Torr through an exhaust pipe 1403, nitrogen was fed as a carrier gas while the flow rate thereof was controlled. Powdered aerosol was generated when the glass bottle 1401 was vibrated by a vibrator 1404 and was then carried to a film-forming chamber 1406 through a pipe 1405 with the carrier gas.

The film-forming chamber 1406 was evacuated by a vacuum pump 1407 to a predetermined evacuation level. The powder was sprayed from a nozzle 1408 onto a substrate 1409 to thereby form a thin film. The substrate 1409 rotated, and a nozzle 1410 was provided at a position opposite to the nozzle 1408 with respect to the center of the substrate 1409 for spraying a powder to selectively remove particles having weak bonding forces. A gas cylinder 1411 containing nitrogen gas was connected to a glass bottle 1412 through a pipe. After a particle-removing powder 1413 was placed in the glass bottle 1412, and the inside thereof was evacuated to approximately 20 Torr through an exhaust pipe 1414, nitrogen was fed as a carrier gas while the flow rate thereof was controlled.

When the glass bottle 1412 was vibrated by a vibrator 1415, powdered aerosol was generated and was then carried to the film-forming chamber 1406 through a pipe 1416. Laser light radiating from a light source 1418 was concentrated on a place of the substrate 1409 onto which the particles are sprayed from the nozzle 1410. A partition 1417 was provided at the center of the film-forming chamber so as to prevent the powdered raw material and the particle-removing powder from being mixed with each other.

PLZT was used as a material for forming the film, zirconia was used as a particle-removing material, and the film was formed on the glass substrate. The rotation speed of the substrate was set to 20 rpm. The incident angle of the film-forming nozzle with respect to the substrate was 0°, and that of the particle-removing nozzle was 15°. $N_2$ was used as a carrier gas of the powdered raw material, the gas flow rate of PLZT was set to a predetermined rate of 8 l/min, and the gas flow rate of zirconia was set to a predetermined rate of 2 l/mm. An argon laser having a wavelength of 488 nm was used, and the power density at an irradiated surface was changed from 0 to 2 $mW/mm^2$, and the transmittance of the film was measured. In the PLZT composition represented by $(Pb_{1-x}La_x)(Zr_yTi_z)_{1-x/4}O_3$, x, y, and z were set to 0.09, 0.65, and 0.35, respectively. The average particle diameter of the powdered raw material PLZT was 0.7 μm, and the average particle diameter of the zirconia used as the particle-removing particles was 0.5 μm.

When the radiation power of the laser was 0, the transmittance of the PLZT film was as low as 51%, and the film thickness was 4 μm. When the radiation power of the laser was increased, the transmittance was gradually increased, and at a power density of 2 $mW/mm^2$, the transmittance was increased to 73%.

In this example, as an electromagnetic wave, visible laser light having a wavelength of 488 nm was used. However, the present invention is not limited thereto, and for example, ultraviolet rays, visible rays, infrared rays, and microwaves may also be used. When the selective removal of particles having weak bonding forces therebetween is promoted by the use of electromagnetic waves, mechanical energy of the particle-removing particles can be decreased. As a consequence, generation of defects and stress caused by the mechanical impact applied to fine crystals for forming the molded body can be suppressed, and as a result, the electrooptic properties of the molded body can be improved.

EXAMPLE 6

Next, an example of an optical modulator using the optical element of the present invention will be described.

First, an ITO film having a thickness of 200 nm was formed as a lower electrode on a glass substrate by sputtering. The substrate was heated to 300° C., and the formation was performed by a magnetron sputtering method using a mixed gas of argon and oxygen.

On the ITO lower electrode, a lift-off resist having a Mach-Zehnder waveguide shape was formed. Subsequently, a PLZT film 2 μm thick was formed as a core layer using the film-forming apparatus shown in FIG. 12. The film-forming conditions were the same as that described in Example 3. Next, after the resist was removed, the surface of the PLZT was planarized by polishing to thereby form a waveguide. Subsequently, a film having a thickness of 3 μm was formed by the method described above using PLZT, which contained an increased La composition of 15% and had a smaller refractive index, and was then polished so that the film thickness was decreased to 2.5 μm, thereby forming a clad layer. On the core layer, an ITO electrode and an Au electrode are sequentially formed by sputtering to form an upper electrode, thereby forming a light modulator.

Light having a wavelength of 1.55 μm was introduced into the light modulator thus formed using a round-end optical fiber, and when a voltage of 10 V was applied to the electrodes, a degree of modulation of 15 dB was obtained.

When the wavelength dependence of the transmission loss of the light modulator of this example was measured, the waveguide loss was 20 dB or less at a wavelength of 800 nm or more, and therefore, it was found that the light modulator described above can be used in practice. In addition, as the wavelength for measurement was increased, the waveguide loss was decreased, and as a result, the loss became 5 dB at a wavelength of 1.55 μm.

In this example, a lift-off method was used for the formation of the PLZT core layer. However, after a film for the PLZT core layer is formed, and a desired shape of the waveguide is formed using a resist, the film may be etched by a reactive ion etching or the like to form the PLZT core layer. Further, in this example, by changing the shape of the waveguide, an optical switch may also be formed.

Since the properties of the optical element of the present invention are independent of an underlying material, the element can be advantageously formed on a polycrystal material having a different crystal structure such as ITO.

Moreover, since being formed regardless of a substrate and an underlying layer, an optical element can be formed on a substrate provided with an optical element such as a laser, electrooptic converter, photoelectric converter, optical amplifier, optical waveguide, or optical filter, or on a substrate provided with an electronic circuit such as a CPU or memory. Thus, an optical integrated device can be formed.

EXAMPLE 7

Figure 15:
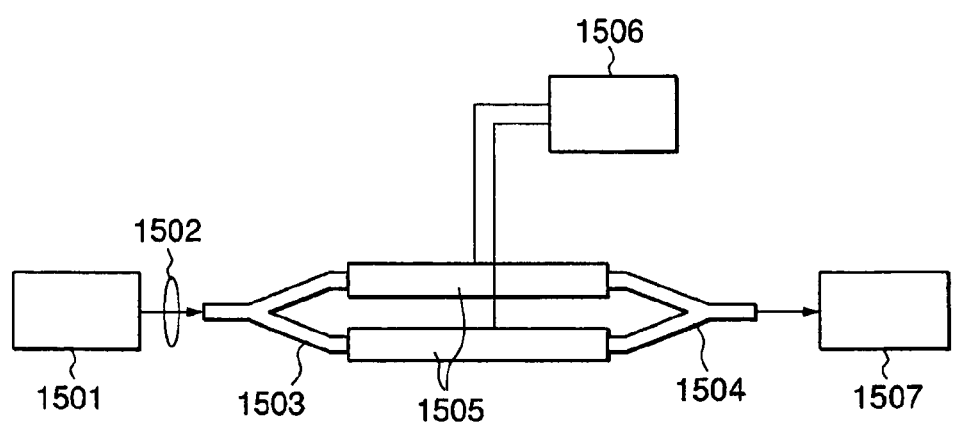
FIG. 15 is a view for illustrating an optical information transmission system according to Example 7 of the present invention.

FIG. 15 is a schematic view showing the structure of an optical information transmission system according to Example 7.

Continuous light emitted from a laser 1501 is concentrated by a microlens 1502 and is then incident on a light modulator 1503. The light modulator 1503 is composed of a Mach-Zehnder waveguide 1504 formed by the same process as that described in Example 6 and electrodes 1505 and is placed on a substrate which is provided with a laser beforehand. A modulation signal generation circuit 1506 is electrically connected to the electrodes 1505, and a high frequency signal driven by voltage is supplied to the electrodes. By the voltage thus applied, the refractive index of the waveguide is changed, and thereby, the optical signal can be modulated. The optical signal thus modulated by the optical modulator is converted into an electric signal by a photoelectric converter 1507.

When a signal of 10 MHz was input into the optical information transmission system of this example, and the wavelength dependence of SIN was measured, S/N was 15 dB or more at a wavelength of 800 nm. Thus, it was found that the optical information transmission system can be used in practice.

EXAMPLE 8

The film-forming method of the optical element is similar to that of the example 1. Specifically, a thin film is formed by the use of the film-forming apparatus shown in FIG. 2.

PZT having a high optical anisotropy was used as a film-forming material and was formed on a glass substrate so as to be transparent. In the composition represented by $Pb(Zr_yTi_z)O_3$, y, and z were set to 0.52, and 0.48, respectively.

Figure 16:
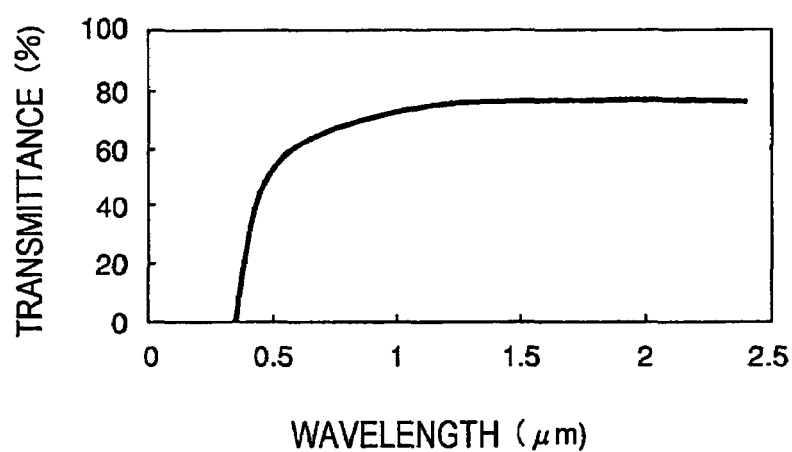
FIG. 16 is a graph showing a transmission spectrum of a sample.

FIG. 16 shows a transmission spectrum of a sample.

The transmittance was measured by the use of the spectrophotometer (UV-365, manufactured by Shimadzu Corporation) in a similar manner with the example 1. The transmittance of the sample was increased with wavelength and was almost saturated at wavelengths of 1 μm or more.

While the present invention has thus far been disclosed in conjunction with several embodiments or examples thereof, it will be readily possible for those skilled in the art to put the present invention into practice in various other manners.

What is claimed is:

1. An optical element produced by applying a mechanical impact to ultra fine fragile particles supplied onto a substrate so that the ultra fine fragile particles are pulverized and bonded to each other to form a molded body, wherein:
$d^6/\lambda^4 21$ $4\times10^{-5}$ nm$^2$ holds, d (nm) being the average radius of a pore or a different phase contained in the molded body, which has a refractive index different from that of a primary component of the molded body, $\lambda$(nm) being the wavelength of light transmitting through the molded body.

2. The optical element according to claim 1, wherein: the optical element comprises a lower electrode, a waveguide, and an upper electrode provided in that order on the substrate, the waveguide being formed from the molded body.

3. An optical element produced by applying a mechanical impact to ultra fine fragile particles supplied onto a substrate so that the ultra fine fragile particles are pulverized and bonded to each other to form a molded body, wherein:
$d^6/\lambda^4 < 1\times10^{-5}$ nm$^2$ holds, d (nm) being the average radius of a pore or a different phase contained in the molded body, which has a refractive index different from that of a primary component of the molded body, $\lambda$(nm) being the wavelength of light transmitting through the molded body.

4. The optical element according to claim 3, wherein: the optical element comprises a lower electrode, a waveguide, and an upper electrode provided in that order on the substrate, the waveguide being formed from the molded body.

5. A method for forming a molded body, comprising the step of:
applying a mechanical impact to ultra fine fragile particles which are supplied onto a substrate so that the ultra fine fragile particles are pulverized and bonded to each other to form the molded body; and
selectively removing particles having weak bonding forces therebetween.

6. The method for forming a molded body according to claim 5, wherein:
the particles having weak bonding forces therebetween are a part of the ultra fine fragile particles, which is insufficiently pulverized, and/or a phase different from a primary component of the molded body.

7. The method for forming a molded body according to claim 5, wherein;
at least one of a material, particle diameter, coagulation state, supplying speed, a hardness, and incident angle of the ultra fine fragile particles which are supplied onto the substrate is a factor of the step of selectively removing the particles having weak bonding forces therebetween, the incident angle of the ultra fine fragile particles being with respect to the substrate.

8. The method for forming a molded body according to claim 7, wherein:
the step of selectively removing particles having weak bonding forces therebetween is performed by ultra fine particles supplied from at least one nozzle which is different from a nozzle supplying the ultra fine fragile particles onto the substrate, the ultra fine fragile particles being formed into a primary component of the molded body.

9. The method for forming a molded body according to claim 8, wherein:
the ultra fine particles are dry ice ($CO_2$).

10. The method for forming a molded body according to claim 7, further comprising the step:
irradiating the molded body with electromagnetic waves in order to selectively decrease bonding forces between the particles having weak bonding forces therebetween, whereby the selective removal of the particles having weak bonding forces therebetween is promoted.

11. An optical integrated device comprising a first optical element and a second optical element integrated therewith on a substrate, the first optical element being formed from a molded body which is formed by applying a mechanical impact to ultra fine fragile particles supplied onto the substrate so that the ultra fine fragile particles are pulverized and bonded to each other, wherein:
$d^6/\lambda^4 < 4\times10^{-5}$ nm$^2$ holds, d(nm) being the average radius of a pore or a different phase contained in the molded body, which has a refractive index different from that of a primary component of the molded body, $\lambda$(nm) being the wavelength of light transmitting through the molded body.

12. The optical integrated device according to claim 11, wherein:
the second optical element is at least one selected from the group consisting of a laser, an electrooptic converter, a photoelectric converter, an optical amplifier, an optical waveguide, and an optical filter.

13. An optical integrated device comprising an optical element and an electronic circuit integrated therewith on a substrate, the optical element being formed from a molded body which is formed by applying a mechanical impact to ultra fine fragile particles supplied onto the substrate so that the ultra fine fragile particles are pulverized and bonded to each other, wherein:
$d^6/\lambda^4 < 4\times10^{-5}$ nm$^2$ holds, d(nm) being the average radius of a pore or a different phase contained in the molded body, which has a refractive index different from that of a primary component of the molded body $\lambda$(nm) being the wavelength of light transmitting through the molded body.

14. The optical integrated device according to claim 13, wherein:
the electronic circuit is at least one of a central processing unit and a memory.

15. An optical information transmission system comprising an optical element formed from a molded body which is formed by applying a mechanical impact to ultra fine fragile particles supplied onto a substrate so that the ultra fine fragile particles are pulverized and bonded to each other, wherein:
said optical element light allows transmission of waves having a wavelength of 800 nm or more.

16. An optical information transmission system comprising an optical integrated device composed of a first optical element and a second optical element integrated therewith on a substrate, the first optical element being formed from a molded body which is formed by applying a mechanical impact to ultra fine fragile particles supplied onto the substrate so that the ultra fine fragile particles are pulverized and bonded to each other, wherein:
a light wave having a wavelength of 800 nm or more is transmitted through the optical integrated device.

17. The optical information transmission system according to claim 16, wherein:
the second optical element is at least one selected from the group consisting of a laser, an electrooptic converter, a photoelectric converter, an optical amplifier, an optical waveguide, and an optical filter.

18. An optical information transmission system comprising an optical integrated device composed of an optical element and an electronic circuit integrated therewith on a substrate, the optical element being formed from a molded body which is formed by applying a mechanical impact to ultra fine fragile particles supplied onto the substrate so that the ultra fine fragile particles are pulverized and bonded to each other, wherein:

a light wave having a wavelength of 800 nm or more is transmitted through the optical integrated device.

19. The optical integrated device according to claim 18, wherein:

the electronic circuit is at least one of a central processing unit and a memory.

20. An optical element produced by applying a mechanical impact to ultra fine fragile particles supplied onto a substrate so that the ultra fine fragile particles are pulverized and bonded to each other to form a molded body, wherein;

$d^6/\lambda^4 < 4 \times 10^{-5}$ nm$^2$ holds, d(nm) being the average radius of a pore or a different phase contained in the molded body, which has a refractive index different from that of a primary component of the molded body, $\lambda$(nm) being the wavelength of light transmitting through the molded body, and $D^6/\lambda^4 < 4 \times 10^{-5}$ nm$^2$ holds, D(nm) being an average radius of the primary component of the molded body, $\lambda$(nm) being the wavelength of light transmitting through the molded body.

21. An optical element, wherein:

$d^6/\lambda^4 < 4 \times 10^{-5}$ nm$^2$ holds, d(nm) being an average radius of a pore or a different phase contained in a molded body, which has a refractive index different from that of a primary component of the molded body, $\lambda$(nm) being a wavelength of light transmitting through the molded body, and $D^6/\lambda^4 < 4 \times 10^{-5}$ nm$^2$ holds, D(nm) being an average radius of the primary component of the molded body, $\lambda$(nm) being the wavelength of light transmitting through the molded body.

* * * * *

UNITED STATES PATENT AND TRADEMARK OFFICE
CERTIFICATE OF CORRECTION

| | |
|---|---|
| PATENT NO. | : 7,120,326 B2 |
| APPLICATION NO. | : 10/998211 |
| DATED | : October 10, 2006 |
| INVENTOR(S) | : Nakada et al. |

It is certified that error appears in the above-identified patent and that said Letters Patent is hereby corrected as shown below:

In Column 19, Line 8, "$d^6/\lambda^4 21\ 4\times10^{-5}n\ m^2$" should read --$d^6/\lambda^4 < 4\times10^{-5} nm^2$--.

Signed and Sealed this

Twentieth Day of February, 2007

JON W. DUDAS
*Director of the United States Patent and Trademark Office*